United States Patent [19]

Beckering et al.

[11] Patent Number: 4,614,859
[45] Date of Patent: Sep. 30, 1986

[54] LIQUID HEATING AND DISPENSING APPLIANCE

[75] Inventors: Jacobus J. Beckering, Willowbrook; Alvin P. Lehnerd, Hinsdale; Walter B. Zoberis, Oak Lawn, all of Ill.

[73] Assignee: John Zink Company, Tulsa, Okla.

[21] Appl. No.: 672,306

[22] Filed: Nov. 16, 1984

[51] Int. Cl.⁴ .......................... H05B 1/02; F24H 1/18; B67D 5/62
[52] U.S. Cl. ....................................... 219/312; 99/281; 99/288; 219/214; 219/308; 219/331; 219/441; 222/146.5
[58] Field of Search ........ 219/312, 308, 214, 310–316, 219/327–331, 296–298, 436, 438, 441, 442; 99/305, 306, 281, 288; 222/146.5, 146.1

[56] References Cited

U.S. PATENT DOCUMENTS

| | | | |
|---|---|---|---|
| 2,730,607 | 1/1956 | Tillison. | |
| 2,894,110 | 7/1959 | Brown. | |
| 2,912,143 | 11/1959 | Woolfolk | 222/129.4 |
| 3,178,557 | 4/1965 | Umann | 219/314 |
| 3,200,999 | 8/1965 | Price, Jr. | 222/185 |
| 3,291,034 | 12/1966 | Sohn et al. | 99/291 |
| 3,351,239 | 11/1967 | Flock | 99/305 X |
| 3,584,568 | 6/1971 | Hausam | 99/282 |
| 3,878,360 | 4/1975 | Augustine et al. | 219/312 |
| 4,165,681 | 8/1979 | Belinkoff | 99/306 X |

FOREIGN PATENT DOCUMENTS

| | | | |
|---|---|---|---|
| 2645472 | 4/1978 | Fed. Rep. of Germany | 219/297 |
| 97849 | 8/1979 | Japan | 219/297 |

Primary Examiner—A. Bartis
Attorney, Agent, or Firm—Neil M. Rose

[57] ABSTRACT

A compact appliance for rapidly electrically heating small quantities of water and dispensing the heated water into vessel includes a housing enclosing a water heating reservoir provided with an electric heating element and connected to a manually actuated water dispensing valve. The housing is provided with a single manually operable lever which is movable in a first direction to close a normally open, manually closed, thermostatic switch is series with the heating element and responsive to the temperature of the reservoir to initiate the water heating operation. After the water is heated, the lever is movable in the opposite direction to actuate the valve to dispense heated water. The valve is integrated with the wall of the housing to minimize the number of parts and simplify the design.

9 Claims, 8 Drawing Figures

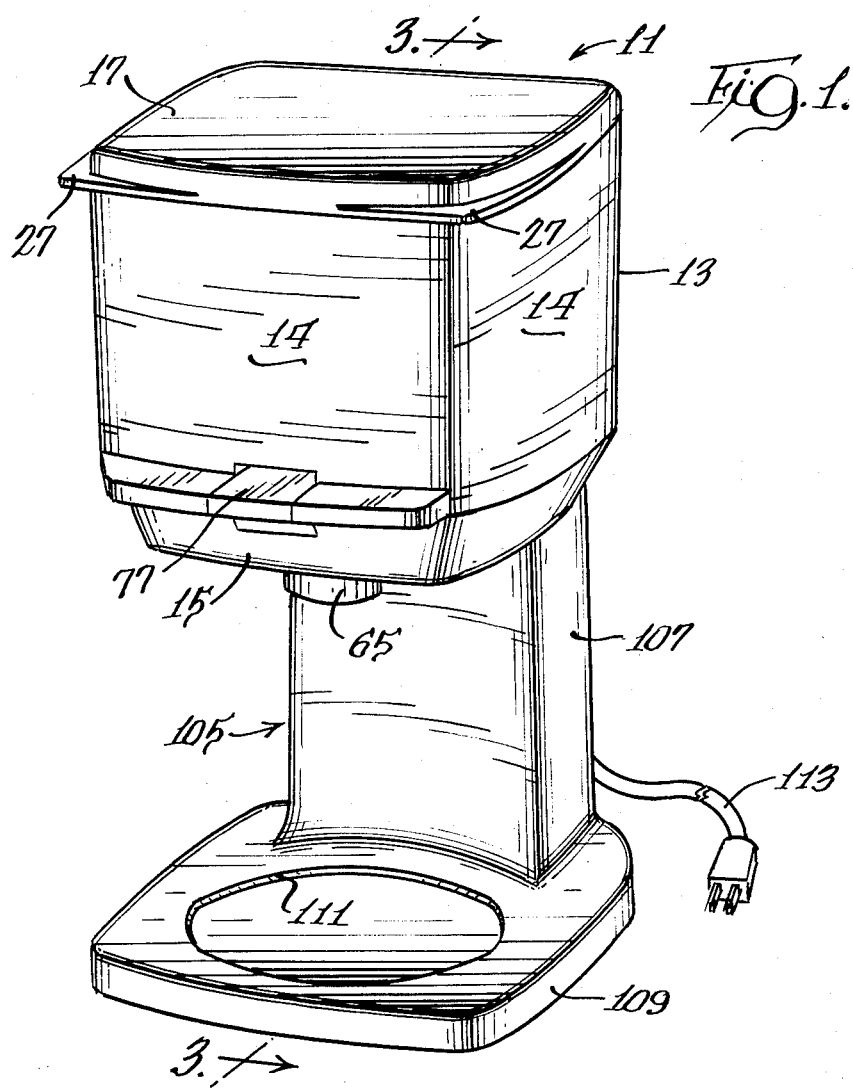
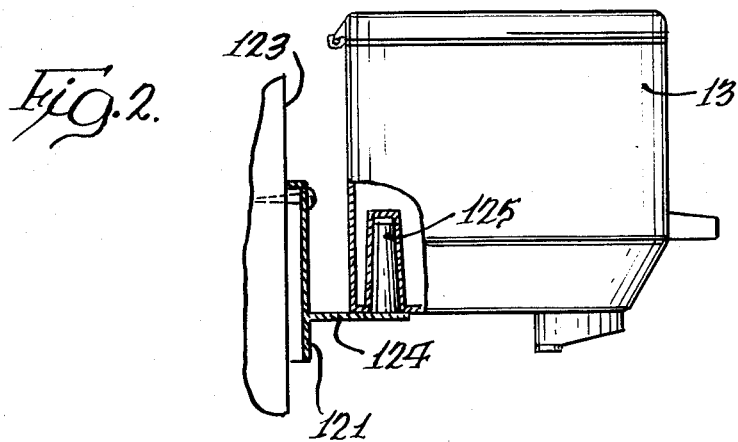

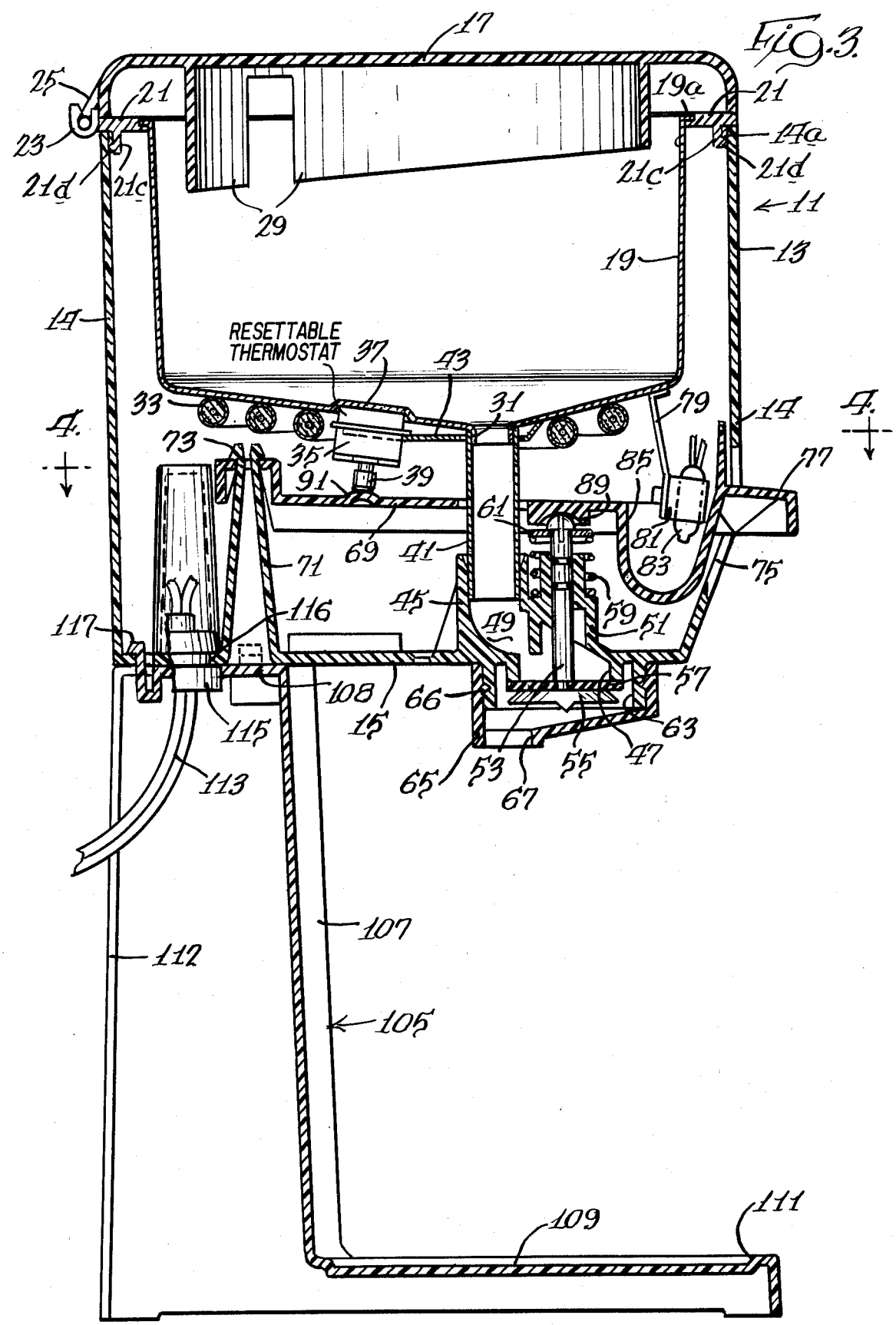

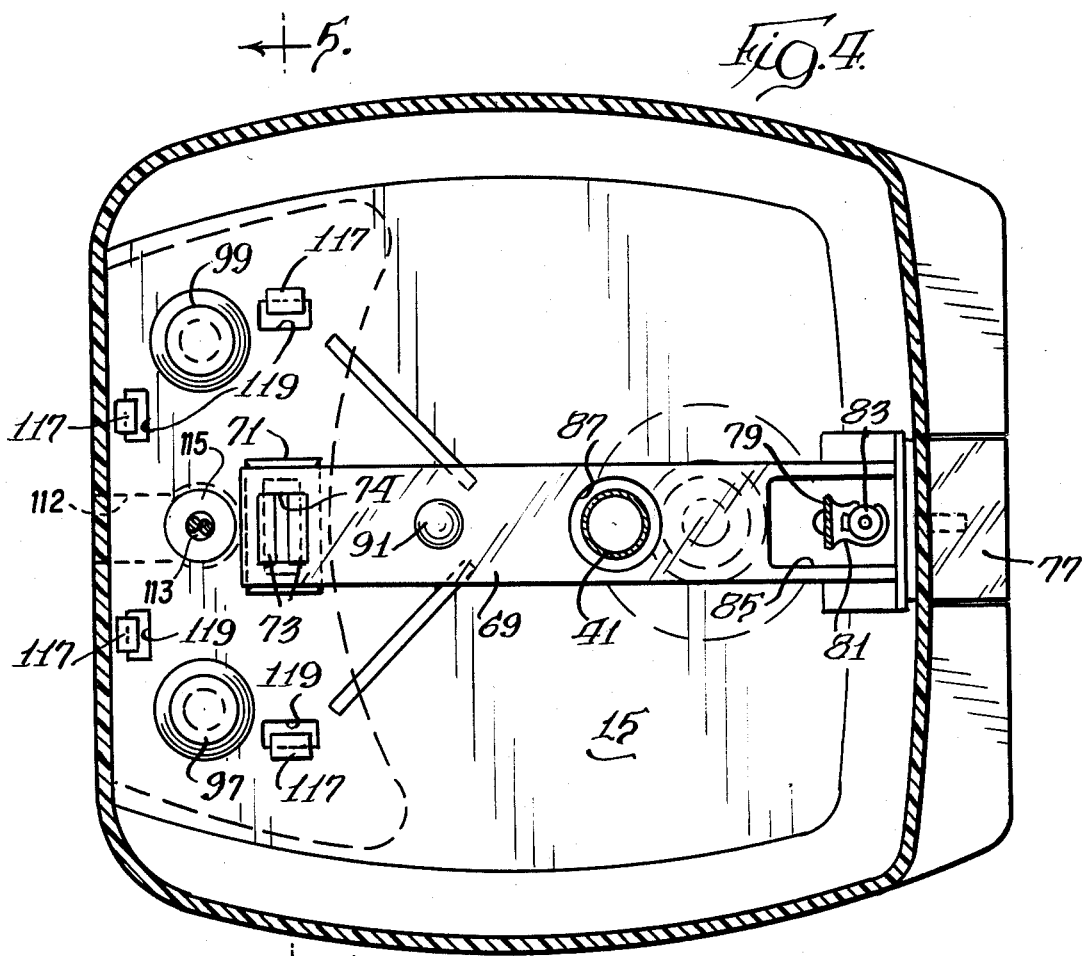
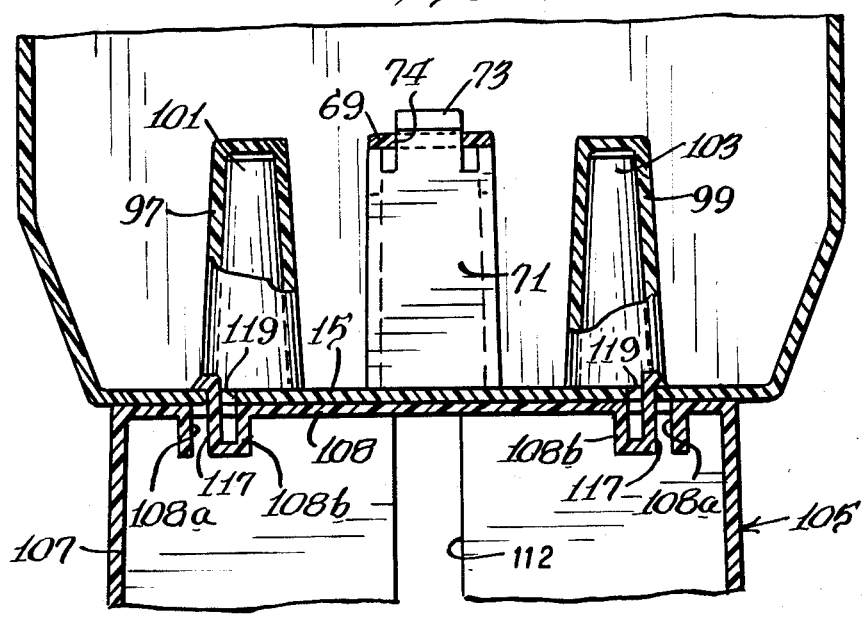

RESETTABLE THERMOSTAT

LIQUID HEATING AND DISPENSING APPLIANCE

BACKGROUND OF THE INVENTION

This invention is an improvement in the liquid heating and dispensing appliance disclosed and claimed in the U.S. Pat. No. 3,878,360(Augustine et al). The present invention and the appliance disclosed in the above-cited patent are intended to provide a simple means for rapidly heating a small quantity of water to a temperature at or near the boiling point. Such appliances are useful in heating water to be used in making tea, instant coffee, soup or other food and beverage products requiring hot water for their preparation. In most cases, a relatively small quantity of water is required. By employing a relatively high wattage heating element of on the order of 1,000 to 1,400 watts, it is possible to heat 8 or 12 oz. of water to the boiling temperature in a period of one and a half minutes.

Since an appliance of this type for heating small quantities of water rapidly performs essentially the same function as a person can perform with a tea kettle on a stove top, it is important that the appliance have significantly better efficiency than the stove top approach and also that it be relatively low in cost. The high wattage element permitting the water to be heated in a minute or two provides a significant time advantage over the time required to heat a similar quantity of water in a tea kettle on a stove top. This improvement in heating time is largely attributable to the association of the high wattage element in intimate heat exchange relationship with the water containing reservoir of the appliance. It is also important that means be provided to determine when the water has reached the appropriate temperature, the boiling point, and also to provide a simple means for dispensing the heated water once it has reached the boiling temperature. In the prior art appliance disclosed in U.S. Pat. No. 3,878,360, separate controls were provided to operate the control thermostat and the valve for dispensing the heated water from the reservoir to a vessel located beneath the reservoir. The present invention involves a considerable simplification in the number of parts included in the appliance and also in the controls used to energize and to dispense the heated water.

SUMMARY OF THE INVENTION

In order to simplify the prior art liquid heating and dispensing appliance, the dispensing valve for the water has been constructed integrally with the wall of the housing so as to minimize the number of separate parts involved. In addition, the dispensing valve and the thermostat have been disposed so that they may be controlled by a single operating lever which moves in one direction to reset the control thermostat and in the other direction to open the water dispensing valve.

The mounting of the operating lever is simplified by providing a fulcrum or pivot for the lever arm which is formed integrally with the housing wall. In addition, the signal light for indicating when the heating element is energized has been mounted in close proximity to the operating lever which is made of a transparent material which will conduct the light from the signal light positioned inside of the housing to a point visible on the outside of the housing.

Recognizing the consumer's interest in having flexibility as to how and where he uses an appliance, the present invention involves use of a basic housing which may be either mounted on a stand for disposition on the countertop or mounted on an alternatively usable bracket which will support the appliance mounted to the wall of the kitchen.

It is, therefore, an object of the present invention to provide an improved liquid heating and dispensing appliance which is low in cost and simple to manufacture.

Another object of the present invention is to provide an improved liquid heating and dispensing appliance which has a single control lever for actuating the control thermostat and operating the valve for dispensing liquid from the reservoir.

Another object of the present invention is to provide a simplified liquid heating and dispensing appliance in which the dispensing valve is made in part integral with the walls of the housing and the operating lever is mounted on a projection molded integrally with the wall of the housing.

It is a further object of the present invention to provide a liquid heating and dispensing appliance which is adapted to either countertop or wall mounting utilizing alternative supports which engage the main housing of the appliance.

Further objects and advantages will become apparent as the following description proceeds and the features of novelty which characterize the invention will be pointed out in the claims annexed to and forming a part of the specification.

BRIEF DESCRIPTION OF THE DRAWINGS

FIG. 1 is a perspective view of an improved water heating and dispensing appliance embodying our invention;

FIG. 2 is a side elevational view of the appliance with a portion shown in cross-section to illustrate the wall mounting of the appliance;

FIG. 3 is a vertical sectional view taken substantially along line 3—3 of FIG. 1;

FIG. 4 is a sectional view taken substantially along line 4—4 of FIG. 3;

FIG. 5 is a fragmentary sectional view taken substantially along line 5—5 of FIG. 4;

DESCRIPTION OF THE PREFERRED EMBODIMENT

Figure 6:
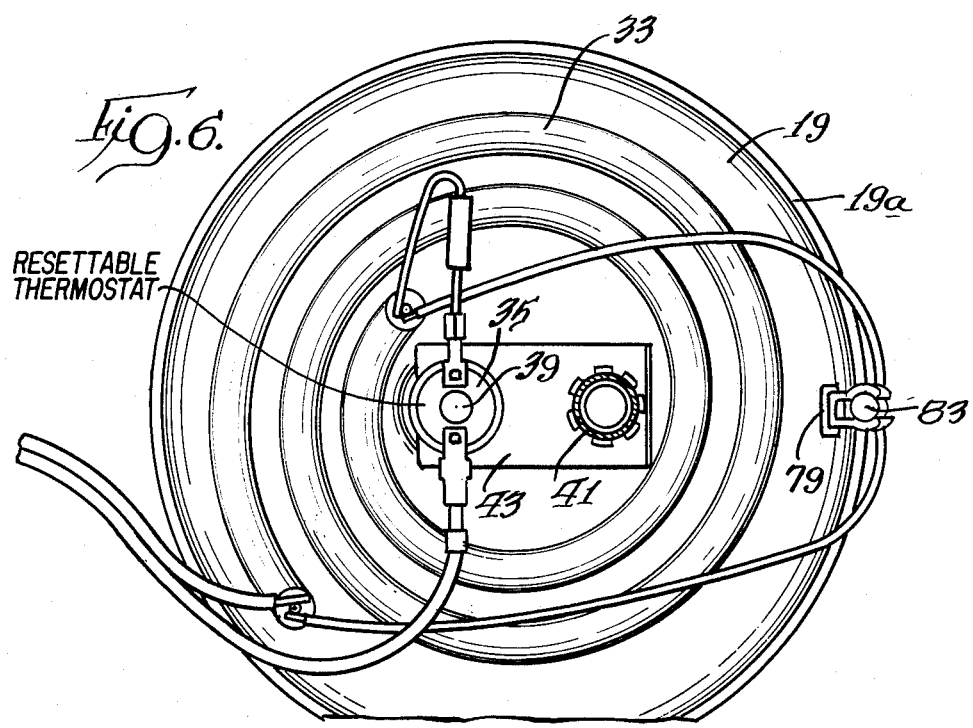
FIG. 6 is a bottom view of the reservoir of the appliance.

Referring to the drawings, there is shown in FIG. 1 a liquid heating and dispensing appliance designated generally by the reference numeral 11. The appliance 11 includes a housing 13 having side walls 14, a bottom wall 15 and a hinged cover 17.

Enclosed within the housing 11 is a cup-shaped reservoir 19 which has an open top surrounded by a circular flange 19a. The flange 19a is adapted to snap into engagement with a top wall 21. The top wall 21 is formed with two hinge projections 23 each of which is formed with an upwardly facing channel 24 which receives the bight portion of a pair of U-shaped bails 25 formed on the hinged cover 17 to provide a hinged connection between the cover 17 and the top wall 21. The cover 17 has integral projections 27 formed at its corners to facilitate lifting the cover 17 to its open position.

Figure 7:
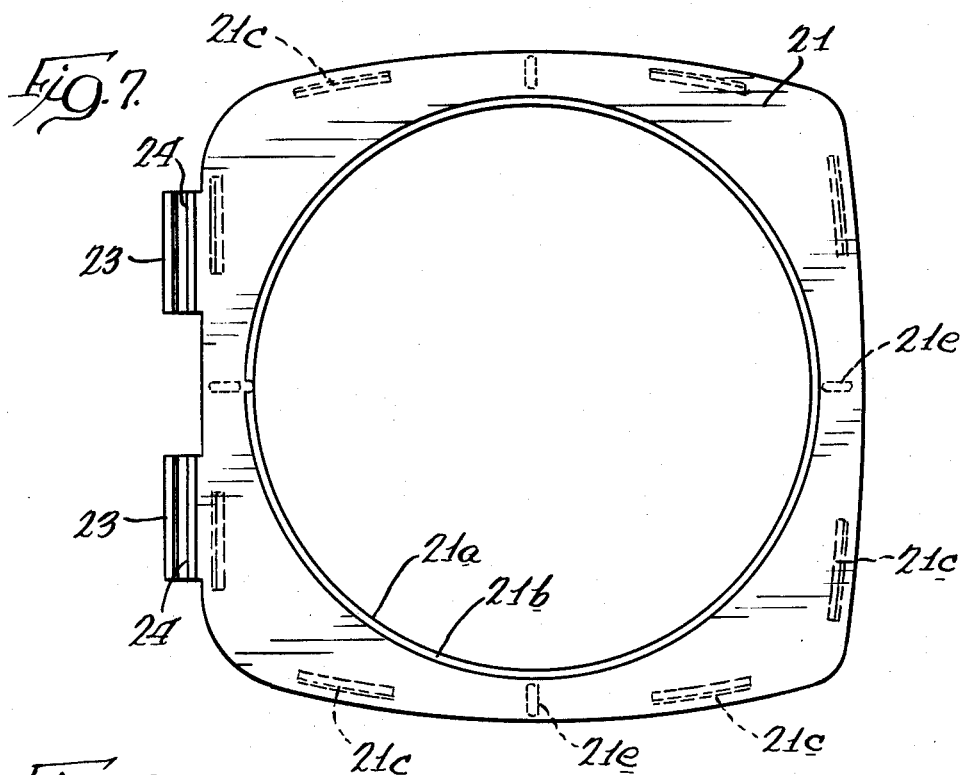
FIG. 7 is a plan view of the top wall of the appliance.
Figure 8:
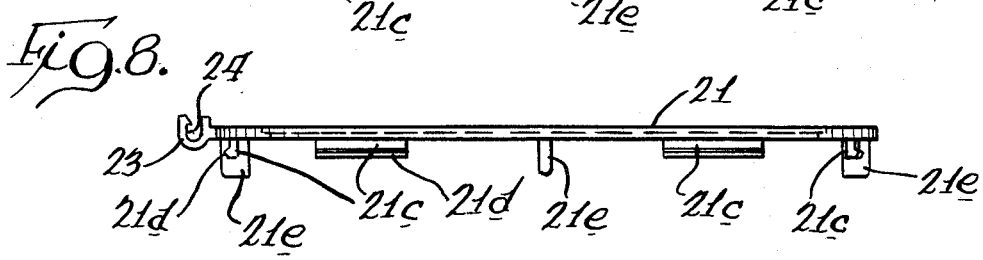
FIG. 8 is an elevational view of the top wall of FIG. 7.

As best shown in FIG. 7, the top wall 21 is a ring-like member having a central opening 21a defined by a peripheral shelf 21b which receives and supports the flange 19a of the reservoir 19. To secure the top wall 21 to the side walls 14 of the housing 13, there are provided eight wall portions 21c which project downwardly from the edges of the top wall 21 as shown in FIG. 8 and in dashed lines in FIG. 7. The wall portions 21c are each formed at their lower ends with a rib 21d which snaps beneath a corresponding rib 14a formed on the inside face of the walls 14 as shown in FIG. 3. Thus, the top wall 21 is retained in assembled relation with the housing 13 by the engagement of the rib 21d on wall portions 21c under the corresponding ribs 14a in the interior of the housing 13. To further increase the rigidity of the walls 14, the top wall 21 is also formed with four walls 21e which are disposed in two perpendicular planes that extend diametrically with respect to opening 21a. As shown in FIG. 8, the walls 21e project downwardly close to the edge of top wall 21 so that they engage in inside surface of the side walls 14 to prevent their flexure.

In order to assure that any condensed moisture which deposits on the inside of cover 17 drains back into the reservoir 19 there is provided a generally cylindrical flange 29 which extends downwardly into the reservoir 19. Even when the cover 17 is in its raised position, moisture which has condensed on the top 17 will run down to the lowest portion of the cylindrical flange 29 and tend to drip back into the reservoir 19.

The reservoir 19 is formed of a suitable corrosive resistant material such as stainless steel. The bottom is angled downwardly toward a flanged opening 31 through which the heated water may be dispensed. For the purpose of heating the reservoir 19, there is provided a coiled, sheathed heating element 33, the configuration of which is best shown in FIG. 6. The heating element 33 is brazed to the bottom of the reservoir 19 to assure good heat conduction between the heating element 33 and the contents of the reservoir 19.

Connected in series with the heating element 33 is a thermostat 35 which is clamped against recessed portion 37 formed in the bottom wall of reservoir 19. The thermostat 35 is a conventional thermostatic switch which is normally open and which may be manually actuated by a control plunger 39 to close the switch contacts contained therein. The switch 35 is adapted to remain in the closed position until the element 33 has heated the contents of the reservoir 19 to a temperature approximately equal to the boiling point of water at which time the bimetallic element contained in the thermostat 35 switches the contacts to the open position where they remain until the switch is once again closed by the plunger 39. Switches of this general nature are well-known in the appliance art and are commonly used in coffee makers, water boilers and the like.

Secured to the flanged opening 31 on the reservoir 19 is a short cylindrical conduit 41 which is pressfitted over the flange. The conduit 41 also supports a bracket 43 which clamps the thermostat 35 against the recess 37 in the bottom of the reservoir.

The bottom wall 15 of the housing 13 is molded to include an integrally formed valve portion 45 which is principally within the housing 13 and a valve seat 47 which extends below the bottom wall 15. These valve portions form an offset valve passageway 49 into which the conduit 41 extends as is best shown in FIG. 3. The bottom wall 15 of the housing 13 is also formed with a valve guide portion 51 which slidably supports a valve member 53. The valve member 53 is provided at its lower end with a closure portion 55 which has a seal 57 associated therewith. A coiled biasing spring 59 is retained by a washer 61 snapped onto the upper end of the valve member 53 so that the valve member 53 is biased upwardly by the spring 59 to urge the gasket 57 into sealed engagement with the valve seat 47. Surrounding the valve seat 47 is an integrally molded flange 63 which supports a valve discharge conduit 65 having projections 66 adapted to snap into assembled engagement with a groove in the flange 63. The discharge conduit 65 has a reduced outlet opening 67 which tends to direct the liquid flowing out between the valve seat 47 and the sealing member 57 into a container placed below the opening 67.

To permit the operator to control the heating and dispensing of the appliance 11, there is provided a control lever 69 which is pivoted at its inner end on a tapered wall 71 which extends upwardly from the bottom wall 15 and which includes snap projections 73 at its upper end which extend through an opening or slot 74 in the lever 69. To snap the lever 69 onto the projections, it is necessary to flex them toward each other so that enlargements at the top of projections 73 may pass through the slot 74. The enlargements in the unflexed position of the projections 73 retain the lever 69 fulcrumed against the top of the tapered wall 71. On either side of the projections 73 and beyond the ends of the slot 74, the tapered wall 71 has bearing surfaces which support the lever 69 for rocking or pivotal movement thereon.

At the end of the operating lever 69, remote from the pivot mounting on wall 71, there is an opening 75 in the wall 14 which permits the lever 69 to extend outwardly of the housing 13 where it has a handle portion 77 at its outer end. The lever 69 is formed of a transparent plastic in order that it may serve as a light pipe to transmit a visual indication of a signal lamp within the housing 13. In this connection there is provided a bracket 79 secured to the lower front edge of the reservoir 19. The bracket 79 has an opening formed in the lower end which receives a transparent bulb mounting clamp 81 as best shown in FIG. 4. The clamp 81 is adapted to receive a bulb 83 which is connected in parallel with the heating element as shown in FIG. 6 and which serves to indicate when the heating element is energized.

As is evident from FIG. 3, the signal light 83 is received in a pocket 85 formed in the lever 69 in such a manner that the light from the signal light is transmitted into the operating handle 77 where it is visible to the operator so he will know whether or not the water has been heated up to its desired temperature. In a preferred embodiment, the lever 69 including the handle 77 was fabricated of a clear colored plastic to provide an easily recognized signal that the heating element is energized.

The operating lever 69 is provided with a clearance opening 87 through which the conduit 41 extends. Adjacent the clearance opening 87 is a cylindrical pad 89 which is recessed to receive the top of the valve member 53. On the other side of the lever 69, adjacent the pivot point, the lever 69 is formed with a bearing surface or dimple 91 against which the plunger 39 of the switch 35 engages the lever 69. In the rest or mid-point position of the lever 69, the valve member 53 and its associated spring 59 bias the lever 69 upwardly whereas the plunger 39 of the thermostatic switch 35 biases the lever 69 downwardly to an equilibrium point.

In order to initiate operation of the appliance 11, the operating lever 69 is simply moved upwardly by applying force on the operating handle 77 until the plunger 39 is moved sufficiently to close the thermostatic switch 35 and commence heating of the liquid contents of the reservoir 19. At this point, the signal light 83 will be illuminated and will be visible through the transparent handle portion 77 of the lever 69. After the contents of the reservoir 19 have been heated to substantially the boiling temperature, the thermostatic switch 35 will open and the signal light 83 will be extinguished. At that point the lever 69 may be depressed by pushing downwardly on the operating handle 77, thereby opening the valve member 53 causing the liquid contents of the reservoir 19 to be dispensed through the opening 67 into a suitable cup or vessel positioned below.

Recognizing the user's current desire to have flexibility in the manner in which he or she uses appliances and mounts them within the kitchen, the appliance 11 includes two alternative mounting arrangements. The bottom wall 15 of the housing 13 includes a pair of truncated, conical projections 97 and 99 as best shown in FIG. 5. These projections are open at the bottom forming recesses which are adapted to receive correspondingly shaped projections 101 and 103 formed at the top of an L-shaped molded plastic base member 105 which has a column portion 107 and a base or pedestal portion 109. The pedestal portion 109 has a circular recess 111 formed therein to receive a suitable cup or other vessel into which the heated water is to be dispensed. The column portion 107 is formed with a generally horizontal top wall 108 from which the projections 101 and 103 extend upwardly. The projections 101 and 103 are received in the downwardly facing recesses defined by the projections 97 and 99 to secure the housing 13 with respect to the base 105. The base 105 is provided with a slot 112 through which a power cord 113 may extend. A suitable strain relief 115 is provided in an opening in the bottom wall 15 of the housing 13 through which the power cord 113 extends. The slot 112 extends into the top wall 108 and into an opening 116 in wall 108 which provides clearance for the cord 113 and strain relief 115 extending outwardly of the housing 13.

In order to insure that the housing 13 is securely retained with respect to the base 105, the column portion 107 is provided at its upper end with latch projections 117 which extend through openings 119 in the bottom wall 15 to secure the housing 13 against vertical movement out of engagement with the base 105. As is evident from FIGS. 3, 4 and 5, there are four of such latch projections 117. The latch projections 117 are molded integrally with the top horizontal wall 108 which is formed with openings 108a. Extending downwardly from wall 108 at the edge of opening 108a is a support wall 108b as best shown in FIG. 5. Each of the flexible latch projections 117 is joined at its lower end to the bottom of wall 108b as shown in FIG. 5. The upper hooked end of each latch 117 is formed with an angled surface which produces a camming action to deflect the flexible latch 117 as it enters the opening 119 when the housing 13 is assembled to base 105.

Shown in FIG. 2 is the alternative wall bracket 120 for the housing 13 which includes wall plate 121 which is adapted to secure by screws or other similar means to the kitchen wall 123. The bracket 120 includes a housing support member 124 which is formed with conical projections 125 similar to the projections 101 and 103 disclosed in connection with the base 105 to engage the recesses in projections 97 and 99 on the housing 13. The bracket 120 may also include the latches 117 disclosed in detail in connection with the base 105.

What is claimed as new and desired to be secured by Letters Patent of the United States is:

1. An improved electric water heating appliance comprising a housing enclosing a water heating reservoir and valve means controlling the dispensing of water from said reservoir, said reservoir having an electric heating element mounted in good heat exchange relation therewith for heating the water therein, support means for mounting said housing over a liquid receiving vessel, said housing having a dispensing passageway with an outlet from said reservoir connected to said passageway, said valve means including a valve member movably mounted in said passageway to selectively seal said passageway, a thermostatic normally open, manually closable switch connected in series with said heating element and mounted in said housing to respond to the temperature of said reservoir, a manually operable lever mounted in said housing for selectively actuating said valve member and said thermostatic switch, said lever having one end extending exteriorly of said housing for manual operation and the other end pivoted within said housing, said lever being biased to a first rest position in which said valve member is in sealed engagement with said passageway and said lever out of actuating engagement with said thermostat, said lever being pivotal in one direction to a second position in which it moves said valve member to its open position in which liquid flows through said passageway, said lever being pivotal in a direction opposite to said one direction to a third position wherein it closes said thermostatic switch.

2. The heating appliance of claim 1 wherein said thermostatic switch is adapted to control said heater so that the contents of said reservoir are heated to a temperature substantially equal to the boiling temperature at which time the switch opens automatically and remains open until it is manually closed by movement of said lever to said third position.

3. The heating appliance of claim 2 wherein said lever is pivoted on a fulcrum formed integrally with said housing, said lever having a transverse slot formed in said other end, a pair of flexible deformable projections on said fulcrum, said projections being insertable when flexed together into said slot and in the unflexed position engage said lever to retain it pivotally connected to said fulcrum.

4. The heating appliance of claim 3 wherein said lever is disposed horizontally with an underside and an upperside, said valve means including spring means biasing said valve member into engagement with said underside of said lever at a point spaced from said fulcrum, said thermostatic switch having an actuator which is spring biased into engagement with said upperside of said lever, the biasing means in said switch and in said valve means acting in opposite direction on said lever retaining said lever in said first rest position.

5. The heating appliance of claim 1 wherein said dispensing passageway includes an offset passageway molded integrally with said housing, a conduit interconnecting said reservoir outlet with said offset passageway, said offset passageway terminating in a valve seat, said valve member including a valve guide and a closure portion, said closure portion engaging said valve seat to seal said offset passageway against liquid flow, the wall of said offset passageway being formed with an elongated opening for slidably supporting said valve guide, spring means biasing said valve guide into engagement with said lever.

6. The heating appliance of claim 4 wherein said lever is formed of a transparent plastic material, a recess formed in said lever within said housing adjacent to said one end, a signal light connected in circuit with said switch and heating element and mounted fixedly within said housing with at least a portion extending into said recess whereby light therefrom is visible through said one end of said lever.

7. An improved electric water heating appliance comprising a housing enclosing a water heating reservoir and valve means controlling the dispensing of water from said reservoir, said reservoir having an electric heating element mounted in good heat exchange relation therewith for heating the water therein, support means for mounting said housing over a liquid receiving vessel, said housing having a dispensing passageway formed integrally with one wall thereof with a reservoir outlet connected to said passageway, said valve means including a valve member movably mounted in said passageway to selectively seal said passageway, a thermostatic switch connected in series with said heating element and mounted to respond to the temperature of said reservoir, said switch being normally open and manually closable and on being actuated to its closed position will remain in said closed position until the water in the reservoir is heated to the boiling temperature at which point the switch automatically opens, manually operable means for closing said thermostatic switch and for moving said valve member from a position in sealed engagement with said passageway to an open position permitting liquid flow through said passageway, said dispensing passageway including an inlet passageway interconnected with an offset passageway molded integrally with said housing, said inlet and offset passageways being parallel and offset with respect to each other, a conduit interconnecting said reservoir outlet with said inlet passageway, said offset passageway terminating in a valve seat, said valve member including a valve guide and a closure portion, said closure portion engaging said valve seat to seal said offset passageway against liquid flow, the wall of said offset passageway being formed with an elongated opening for slidably supporting said valve guide, and spring means biasing said closure portion against said valve seat.

8. An improved electric water heating appliance comprising a housing enclosing a water heating reservoir and valve means controlling the dispensing of water from said reservoir, said reservoir having an electric heating element mounted in good heat exchange relation therewith for heating the water therein, support means for mounting said housing over a liquid receiving vessel, said housing having a dispensing passageway formed integrally with one wall thereof with a reservoir outlet connected to said passageway, said valve means including a valve member movably mounted in said passageway to selectively seal said passageway, a thermostatic switch connected in series with said heating element and mounted to respond to the temperature of said reservoir, said switch being normally open and manually closable and on being actuated to its closed position will remain in said closed position until the water in the reservoir is heated to the boiling temperature at which point the switch automatically opens, manually operable means for closing said thermostatic switch and for moving said valve member from a position in sealed engagement with said passageway to an open position permitting liquid flow through said passageway, said dispensing passageway including an offset passageway molded integrally with said housing, a conduit interconnecting said reservoir outlet with said offset passageway, said offset passageway terminating in a valve seat, said valve member including a valve guide and a closure portion, said closure portion engaging said valve seat to seal said offset passageway against liquid flow, the wall of said offset passageway being formed with an elongated opening for slidably supporting said valve guide, spring means biasing said closure portion against said valve seat, said housing having side walls, a bottom wall and a top wall, said reservoir being mounted in said top wall and said manually operable means including a lever pivoted within said housing and extending exteriorly of said housing through one of said side walls, said valve seat comprising a circular flange extending below said bottom wall.

9. The appliance of claim 8 including a discharge conduit connected to said housing to receive liquid flow from said offset passageway through said valve means, said discharge conduit being a funnel-like member which is greater in diameter than said valve seat at the top and tapers to a smaller discharge opening.

* * * * *